United States Patent
Owens

(10) Patent No.: US 6,722,597 B2
(45) Date of Patent: Apr. 20, 2004

(54) APPARATUS AND METHOD FOR SHREDDING BLOCKS OF MATERIAL

(75) Inventor: Shawn Owens, Joplin, MO (US)

(73) Assignee: Schreiber Foods, Inc., Green Bay, WI (US)

( * ) Notice: Subject to any disclaimer, the term of this patent is extended or adjusted under 35 U.S.C. 154(b) by 0 days.

(21) Appl. No.: 10/372,625

(22) Filed: Feb. 21, 2003

(65) Prior Publication Data

US 2003/0129288 A1 Jul. 10, 2003

Related U.S. Application Data

(63) Continuation of application No. 10/022,630, filed on Dec. 17, 2001, now Pat. No. 6,536,692, which is a continuation of application No. 09/492,102, filed on Feb. 14, 2000, now Pat. No. 6,340,490.

(51) Int. Cl.[7] .......................... B02C 13/00; B02C 18/00
(52) U.S. Cl. .......................... 241/92; 241/93; 241/282
(58) Field of Search .............................. 425/301, 307; 426/518, 582; 241/30, 92, 93, 280, 282, 295

(56) References Cited

U.S. PATENT DOCUMENTS

| | | |
|---|---|---|
| 3,502,125 A | 3/1970 | Desnick |
| 3,900,574 A | 8/1975 | Warwick |
| 5,462,235 A | 10/1995 | Driscoll et al. |
| 5,527,551 A | 6/1996 | Fager et al. |
| 5,573,805 A | 11/1996 | Fager et al. |
| 5,601,855 A | 2/1997 | Fager et al. |
| 6,340,490 B1 | 1/2002 | Owens |

FOREIGN PATENT DOCUMENTS

DE 29 12218 A1 10/1980

OTHER PUBLICATIONS

"Model CC Instruction Manual", Urschel Laboratories Incorporated 1526 Mar 94.
Hobart Shredder Diagram, Hobart Manufacturing Co. of Tory, Ohio.
"Corenco Disintegrators," Corenco, Inc., 6760 Depot St., Sebastopol, CA 95472 (M8, M12A, M15DA, M18A, Sep. 1, 1999).

*Primary Examiner*—George C. Yeung
(74) *Attorney, Agent, or Firm*—Brinks Hofer Gilson & Lione

(57) ABSTRACT

An apparatus and method for shredding a block of material, the apparatus includes at least one cutting blade. A drive unit rotates the cutting blade about an axis, and a feed unit moves the block of material toward the cutting blade. The axis about which the cutting blade is rotated is generally perpendicular to the direction in which the block of material is being fed. In one embodiment, the block of material comprises a plurality of ribbons, the ribbons being stacked atop each other. In one preferred embodiment, the cutting blade comprises a serrated edge, and the distance between the teeth in the serrated edge is less than the thickness of each ribbon. In another embodiment, the shredding unit includes a plurality of blades on a rotatably driven drum.

28 Claims, 10 Drawing Sheets

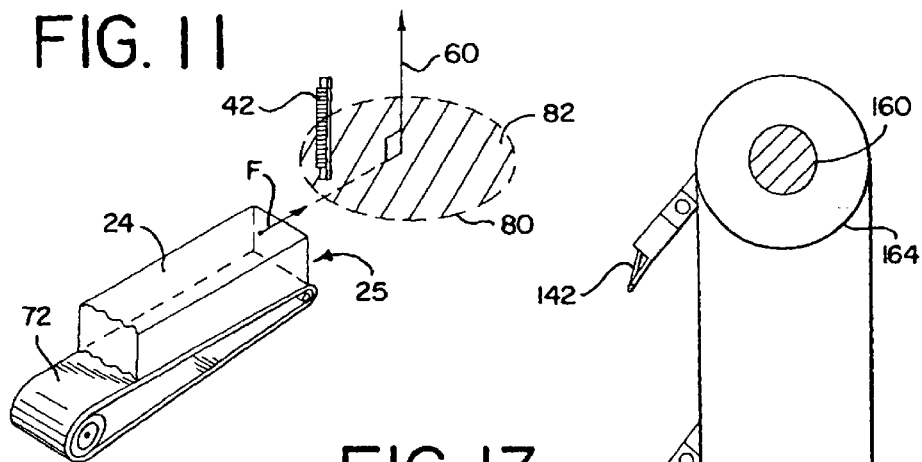
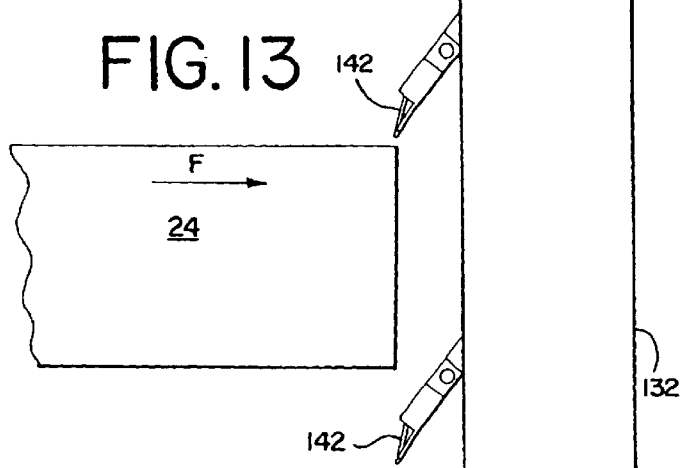
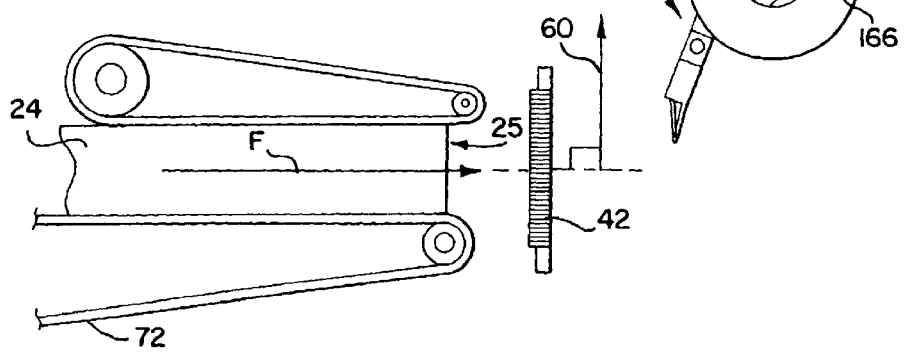

APPARATUS AND METHOD FOR SHREDDING BLOCKS OF MATERIAL

RELATED APPLICATIONS

This application is a continuation of application Ser. No. 10/022,630, filed Dec. 17, 2001, now U.S. Pat. No. 6,536,690 which is a continuation of application Ser. No. 09/492,102, filed Feb. 14, 2000, now U.S. Pat. No. 6,340,490, all of which are incorporated by reference herein.

TECHNICAL FIELD

The present invention relates to a method and apparatus for shredding a block of material, such as a moldable, plasticized product and, in particular, to a method and apparatus for forming shreds of a food product, such as cheese. The present invention is particularly useful for forming shreds from relatively long or continuous blocks of material, such as cheese.

BACKGROUND

Although the following description is focused on forming shreds from a block of cheese, it will be recognized by those skilled in the art that the present invention encompasses forming shreds from a block of any suitable material. As used herein, the term "shredding" refers to the process of shredding a block of material into shreds or slicing a block of material into smaller pieces.

Traditionally, machines for shredding cheese have been designed to cut non-continuous, blocks of cheese. For example, one known method of shredding cheese takes large blocks of cheese, typically having a height of about 7 inches, a width of about 11 inches, and a length of about 14 inches, and cuts up the large blocks of cheese into small, finite cubes of cheese having a height of about 1 inch, a width of about 1 inch, and a length of about 1 inch. The cubes of cheese are then shredded using a centrifugal shredder, such as the Model CC shredder manufactured by Urschel Laboratories, Inc, of Valparaiso, Ind. (the "Urschel shredder"). In the Urschel shredder, the cubes of cheese are dropped into a stationary cylindrical chamber housing a series of blades. The cylindrical chamber is positioned around a rotating plate having a series of impellers. The blades are lined up against the wall of the cylinder. The centrifugal force caused by the rotating plate moves the cubes of cheese from the center of the rotating plate out towards the edges of the rotating plate. As the cubes of cheese approach the edges of the rotating plate, the cubes of cheese are pressed up against the wall of the cylinder and the series of impellers drag the cubes of cheese across the wall and past the blades, resulting in the cutting of the cubes of cheese.

Such conventional shredders have some disadvantages. Centrifugal shredders use a considerable amount of energy in cutting the cubes of cheese, since the cheese must be moved across the rotating plate, pressed firmly against the wall of the cylinder, and dragged across the wall and past the blades in order to cut the cheese. Moreover, the large blocks of cheese must be formed and then cut into small cubes of cheese in order to use a centrifugal shredder.

Another known method of shredding cheese is to take long, narrow blocks of cheese, typically having a height of about 3.5 inches, a width of about 5.5 inches, and a length of about 14.0 inches, and use a cheese shredder having a cutting disc to cut the long, narrow blocks of cheese. The cutting disc rotates about an axis parallel to the length of the block of cheese. Such a cheese shredder is manufactured by Hobart Manufacturing Co. of Troy, Ohio (the "Hobart shredder"). In this arrangement, the long, narrow blocks of cheese are pressed up against the cutting disc which is comprised of a series of blades. As the cutting disc rotates, the long, narrow blocks of cheese are cut. In order to shred cheese with such a device having a cutting disc, the cheese must be formed into long, narrow blocks of cheese before the cheese can be shredded.

It is also known that certain manufacturing processes produce products that are not as easily shredded as products produced by other processes. For example, in one known process, cheese is melted and extruded into a thin sheet upon a surface such as a moving belt. In this process, molten cheese is fed into a manifold, which distributes the molten cheese in a layer onto a continuously moving endless belt, which is commonly called a casting belt. Such a process, and the apparatus used in such a process, is described, for example, in U.S. Pat. Nos. 5,527,551 and 5,573,805. The thin, continuous sheet of cheese may have a width of about 36 inches, for example. The thin sheet may then be cut along its width to form a plurality of thin ribbons, and then the plurality of thin ribbons may be stacked on top of each other to form continuous, stacked ribbons of cheese. The stacked ribbons of cheese form or define a continuous block of cheese (i.e., a block formed from the stack of ribbons). Although processing the cheese to form a continuous block in the manner described above provides significant manufacturing advantages, conventional shredders such as the centrifugal shredders are not designed to handle stacked ribbons of cheese. Rather, such shredders are designed to handle finite cubes of cheese. The stacked ribbons of cheese formed by the casting belt arrangement are typically too thin to be shred by a centrifugal shredder.

Another known shredder is disclosed in U.S. Pat. No. 5,601,855. In the shredding device disclosed in this patent, a continuous sheet of cheese from a casting belt is shred by a comb-like arrangement. The sheet is fed in a feed direction to a rotating comb with fingers that extend radially outward. The fingers sheer the thin sheet of cheese into shreds. At the point of contact between the fingers and the sheet of cheese, the fingers of the comb are substantially parallel with the sheet and extend in the feed direction. Thus, the shreds are formed from the sheet such that the length of each shred is parallel to the feed direction. One disadvantage of this arrangement is that the shreds have a uniform, substantially rectangular configuration. The shape of the shreds is dictated by the fingers in the comb. There is little ability to change the shape of the shreds. It has been found that the consumer, however, prefers a more traditional looking shred of cheese. Traditional shreds of cheese have a more feathered look. The feathered look is provided by the blade geometry and by shredding a block, instead of a sheet, of cheese.

Cheese shredders of the cutting disc-type are also not designed to cut stacked ribbons of cheese. Such cutting disc-type shredders used on a stack would result in unacceptable sizes and shapes for the shreds. The reason is that the path of the cutter does not follow the plane of the ribbons. As the blade in cutting disc-type shredders rotate, shreds would be formed in an arc across the face of the ribbons.

Therefore, a number of characteristics are desirable for an apparatus to efficiently cut ribbons of cheese, such as a block formed from continuous, stacked ribbons of cheese. Preferably, the apparatus cuts the cheese using less energy than traditional methods.

BRIEF SUMMARY

In view of the above limitations of existing cheese shredders, it is an aspect of the present invention to provide an apparatus for shredding a block of a material, such as cheese. The apparatus comprises a cutting unit having a cutting blade. The cutting blade is arranged to rotate about an axis. A feed unit moves the block of material in a feed direction toward the cutting unit. The feed direction is generally perpendicular to the axis about which the cutting edge rotates. Shreds of cheese are cut from the block such that the length of the shreds lies along the face of the block.

In one preferred embodiment, the block of material comprises a plurality of ribbons, wherein the ribbons are stacked atop each other. In one preferred embodiment, the cutting blade comprises a serrated blade having a plurality of teeth, and the distance between the teeth is less than the thickness of each ribbon.

Another aspect of the present invention is a method for shredding a block of material, the method comprising moving the block of material in a feed direction toward a cutting unit. The cutting unit has at least one cutting blade. The cutting blade is rotated about an axis that is generally perpendicular to the feed direction such that as the block of material reaches the cutting blade, the cutting blade moves across the face of the block and shreds the material across the face of the block.

In yet another aspect of the invention, an apparatus for shredding a block of material includes a shredding unit having a plurality of blades on a rotatably driven drum, the drum rotating about a substantially vertical axis. A drive unit rotates the drum about the axis. A feed unit moves the block of material on a feed plane toward the shredding unit in a feeding direction, the feed unit being disposed upstream of the shredding unit, and the feeding direction being substantially perpendicular to the substantially vertical axis about which the drum rotates. In operation, the plurality of blades cut shreds of material from a front face of the block.

BRIEF DESCRIPTION OF THE DRAWINGS

FIG. 11 illustrates a perspective view of a portion of an apparatus for cutting a block of material, according to one preferred embodiment; and FIG. 12. illustrates a partial cross-sectional side view of an apparatus for cutting a block of material, according to one preferred embodiment.

FIG. 13 illustrates an alternative embodiment of the cutting unit.

Figure 1:
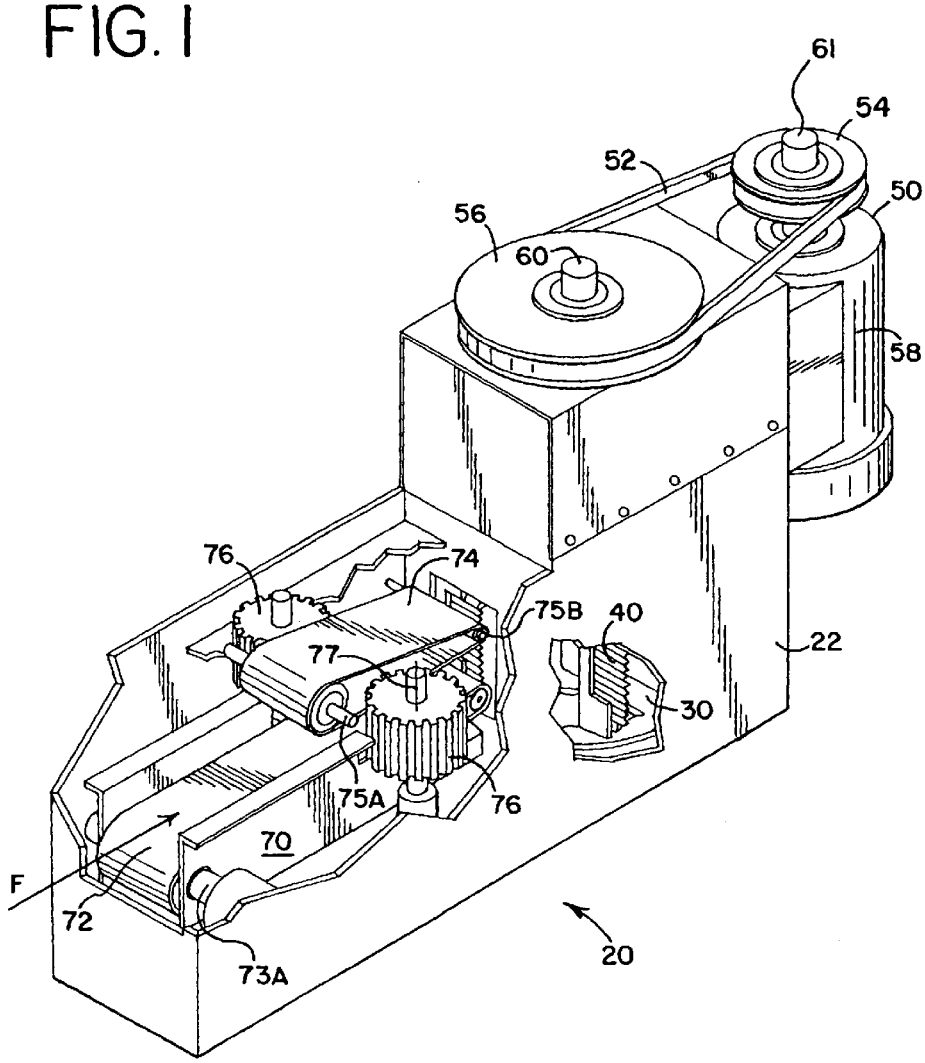
FIG. 1 illustrates a perspective view of a preferred embodiment of an apparatus for shredding a block of material.
Figure 2:
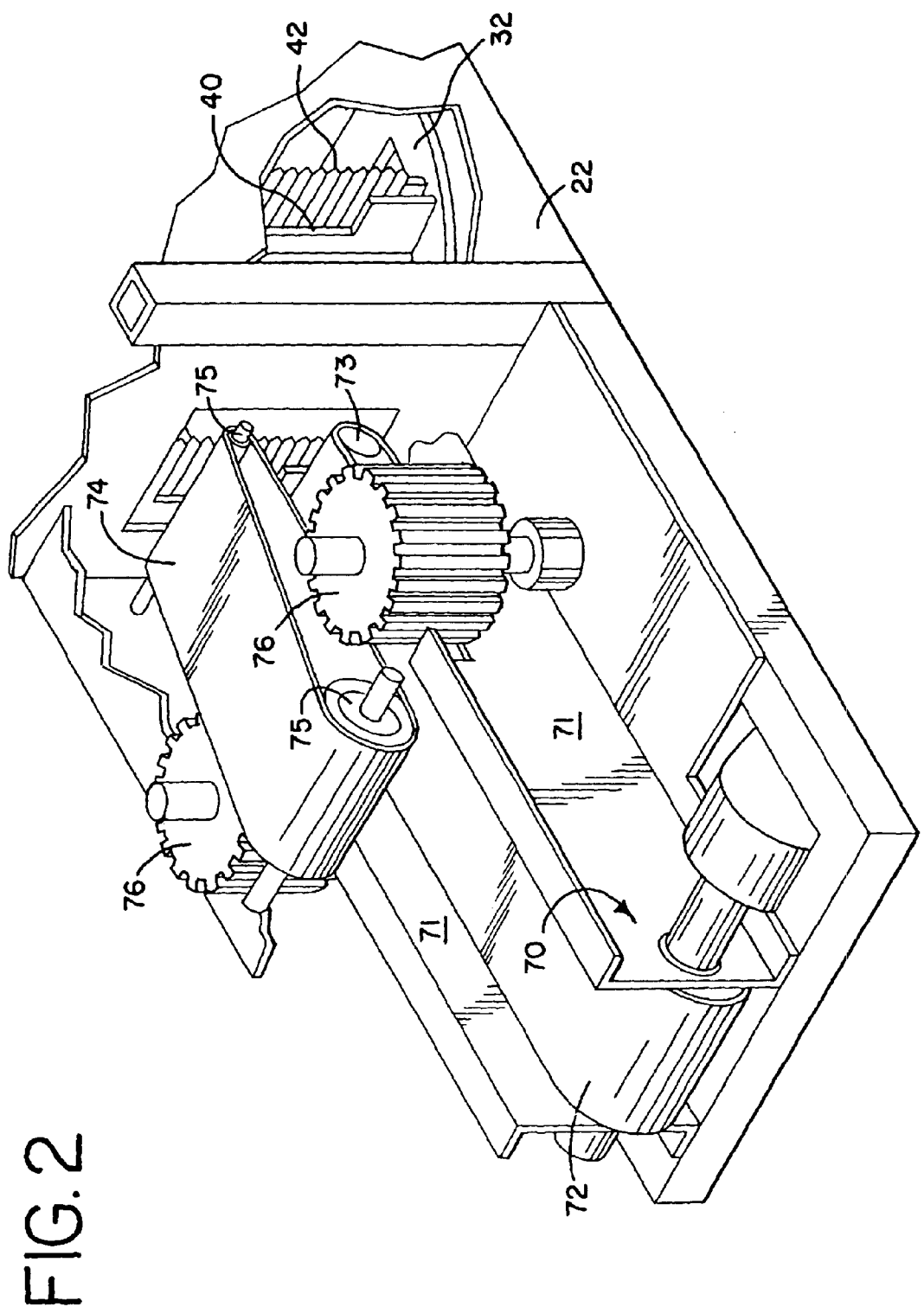
FIG. 2 illustrates an enlarged perspective view of a feed unit and a cutting unit from the apparatus shown in FIG. 1, according to one preferred embodiment.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION

Shown in FIG. 1 is a shredding apparatus 20 for shredding a block of material 24, such as a block of cheese. Although the following description is described with respect to the shredding of a block of cheese, it will be recognized by those skilled in the art that the block may comprise other food items to be shredded, such as meat, and processed meat. Further, it will be recognized by those skilled in the art that the block 24 may comprise a block of any suitable material to be shredded such a semi-solid block of material, or a stack of material, such a stack of ribbons 26.

Referring now specifically to FIGS. 1–4, a preferred embodiment of a shredding apparatus 20 is illustrated. The shredding apparatus comprises a feed unit 70, a shredding unit 30 and a drive unit 50. The feed unit 70 is located upstream of the shredding unit and conveys the block to the shredding unit 30, described in more detail below. The drive unit is used to drive the cutting blade or edge about an axis and to move the cutting blade across the downstream or front face of the block. As the cutting edge traverses the front face of the block, the front portion of the block is cut into shreds. As can be seen, the blade cuts across cross-section of the block of material 24. The shreds are formed such that the length of the shreds is aligned with the plane of the cross-section from which the shreds are cut.

The feed unit 70 comprises a conveyor belt 72 that is revolvingly driven about rollers 73A and 73B. In the exemplary embodiment shown, the width of the belt 72 is 4.5 inches and the conveyor belt is made of a polyurethane material. As shown best in FIGS. 3 and 4, the block of material 24, such as a block of cheese, is supported on the surface of the belt 72 and is conveyed in the feed direction F as the belt 72 is driven about the rollers 73A and 73B. Thus, the surface of the belt 72 defines a conveying or feed plane on which the block of material 24 lies. In an exemplary embodiment, the feed belt 72 is driven at a linear speed of 30 ft./min. and the block of cheese 24 is moved by the feed belt 72 at the same speed. As illustrated, a plate 71 is disposed on each side of the conveying belt 72. The plates 71 form part of the frame of the conveyor unit and are made of stainless steel.

Preferably, the feed unit 70 also comprises a pair of feed guides 76. In the embodiment illustrated in the figures, each feed guide 76 comprises a gear-like roller 76 that rotates about an axis 77. One feed guide 76 is located on each side of the feed belt 72. The teeth on the outer surface of the feed guide rollers 76 may be comprised of any suitable material such as Delrin™. In the exemplary embodiment shown, the diameter of each feed roller guide 76 is approximately 2 inches. The distance between the outer circumferences of the feed guide rollers 76 is such that it is substantially equal to the width of the block of cheese coming in. Thus, the teeth of rollers 76 are tightly pressed against the block of cheese 24. Suitable feed guide rollers 76 are gears manufactured commercially available from numerous sources. In this manner, as the block of cheese is fed in the feed direction, the block of cheese is engaged by the outer surfaces of the feed guide rollers 76 to assure that the block of material remains substantially centered on the feed belt 72. In the exemplary embodiment shown, the feed guide rollers 76 are driven by a suitable driving unit. It will be recognized by those skilled in the art, that the feed guides 76 may also be other suitable feed mechanisms such as a belt, a gear, or a wheel.

As shown in FIGS. 1–4, preferably the feed unit 70 further comprises a top belt 74 that engages the top surface of the block of cheese 24. The top belt 74 is revolvingly driven about rollers 75A and 75B. The top conveyor belt 74 engages the top surface of the block of cheese 24 to prevent the block of cheese 24 from buckling. The second drive belt is driven by a suitable drive unit. Preferably, the top belt 74 has a width of 3 inches and is made of any suitable material, such as polyurethane. In the illustrated embodiment, the distance between surfaces of belts 72 and 74 that engage the lower and upper surfaces of the block of cheese is built may of course be adjusted depending on the height of the block of cheese. Alternatively, a driven roller (not shown) may be used instead of the top belt 74. In both embodiments, a rotating surface (i.e., the surface of the belt or the surface of the roller) opposed to the bottom belt 72 engages the top surface of block of material 24. It is preferred that a single drive unit drive the bottom belt 72, the top belt 74 (or the roller) and the feed guides 76.

It will be recognized by those skilled in the art that other suitable feed arrangements may be used. For example, the block of cheese 24 may be fed to the shredding unit 30 by a single conveyor belt, a series of rollers, a mechanical arm, or a hydraulic mechanism.

Figure 3:
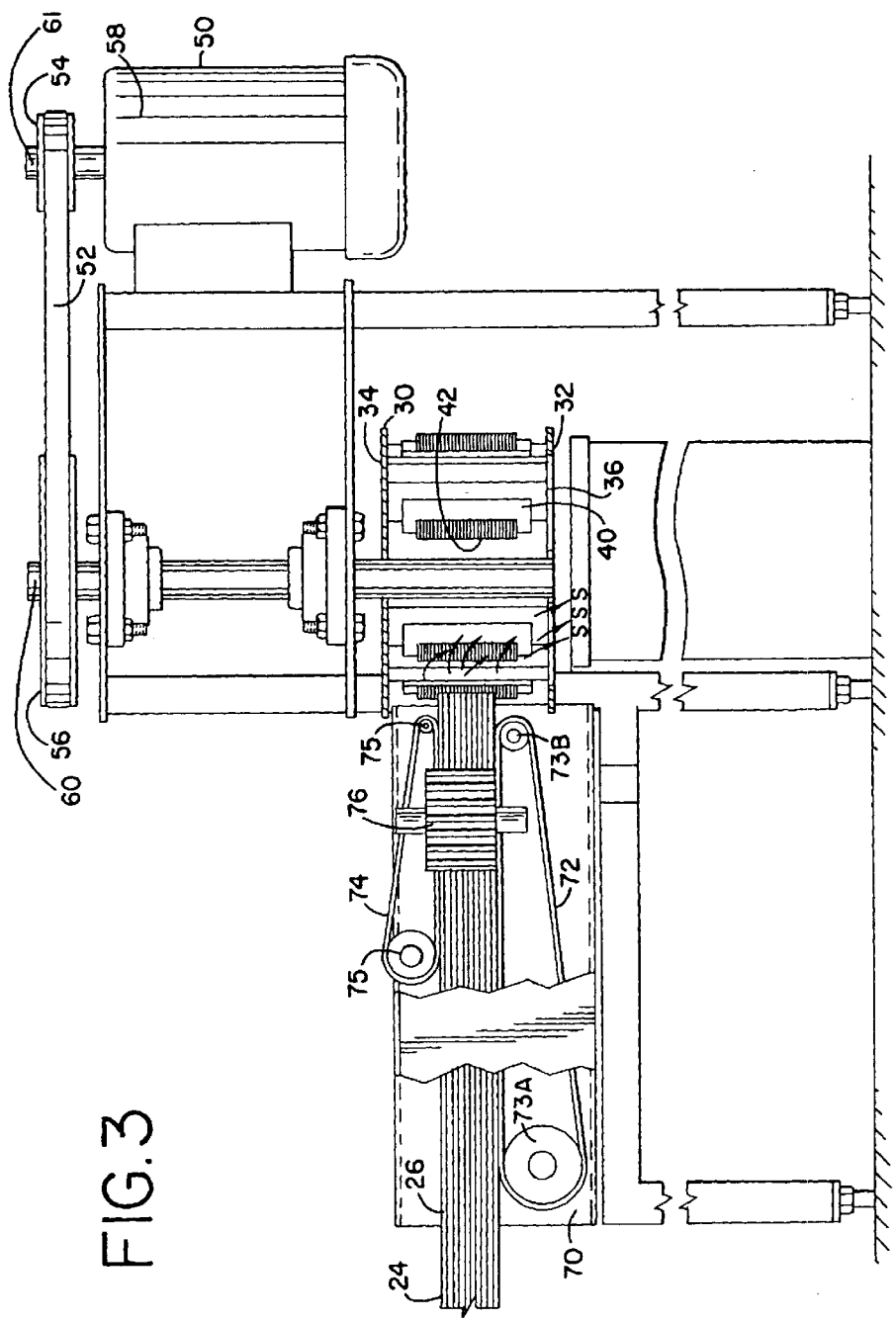
FIG. 3 illustrates a partial cross-sectional side view of the apparatus shown in FIG. 1, according to one preferred embodiment.
Figure 4:
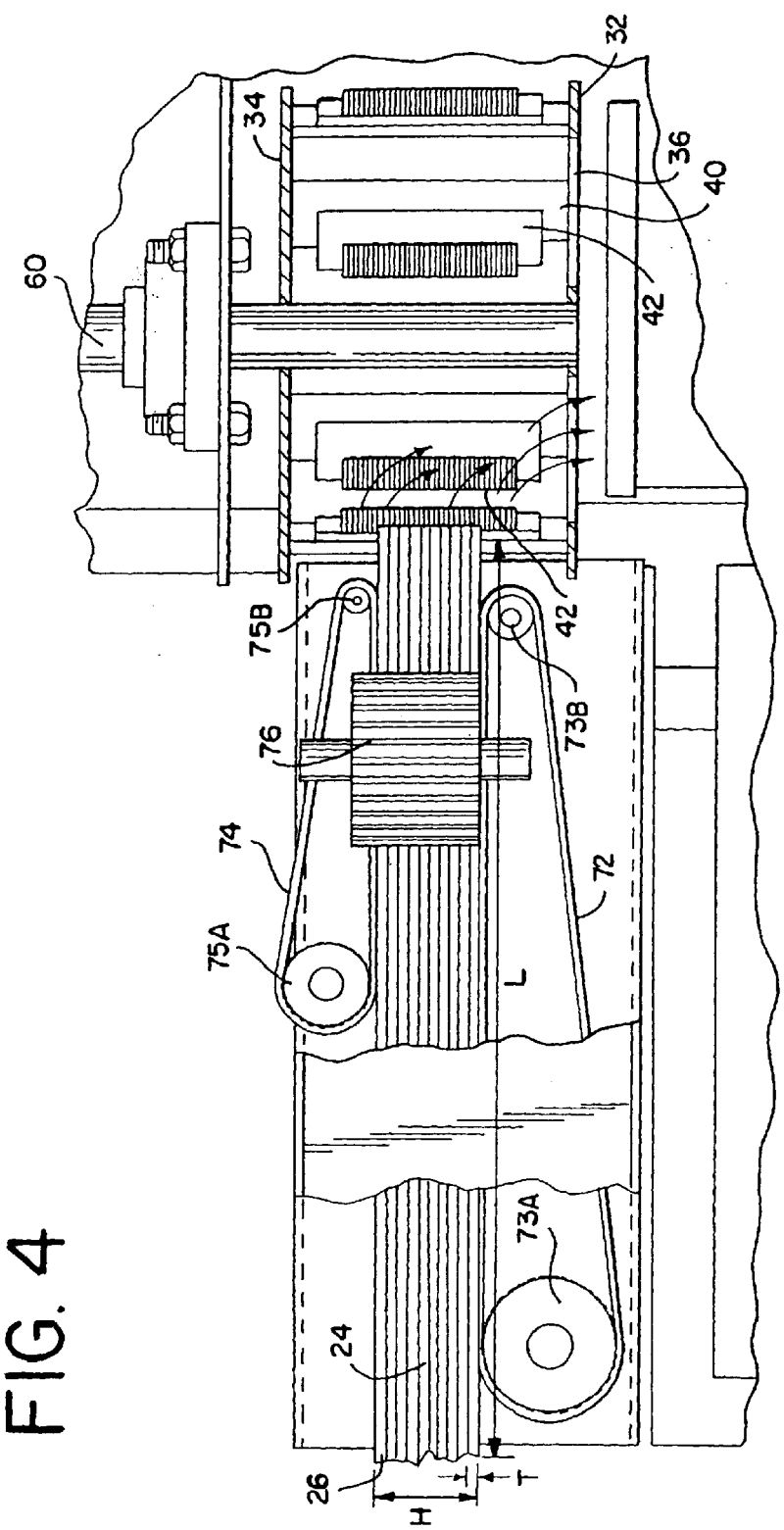
FIG. 4 illustrates a partial cross-sectional side view of the apparatus shown in FIG. 1, according to one preferred embodiment.

As best illustrated in FIGS. 3 and 4, the feed unit 70 feeds the block of cheese 24 to a shredding unit 30. The shredding unit 30 in the exemplary embodiment shown is comprised of at least one cutting blade or edge 42 that is revolvingly driven about a first shaft 60. As illustrated, the longitudinal edge of the cutting edge 42 is rotatably driven about the shaft 60 such that it engages the front face of the block 24.

The block of material has a height H and a width W. The cross-sectional surface of the block defined by the height H and the width W defines a cross-sectional surface of the block of cheese 24. In a typical example, the height H is 2.5 inches and the width W is 3.0 inches. The most downstream cross-sectional surface of the block of material 24 that engages the cutting edge 42 is defined as the front face of the block of cheese 24. That is, the front face of the block of cheese 24 is defined as the most downstream part or face of the block 24 relative to the cutting edge 42. The thickness of the shreds is defined in the feed direction F.

Figure 5:
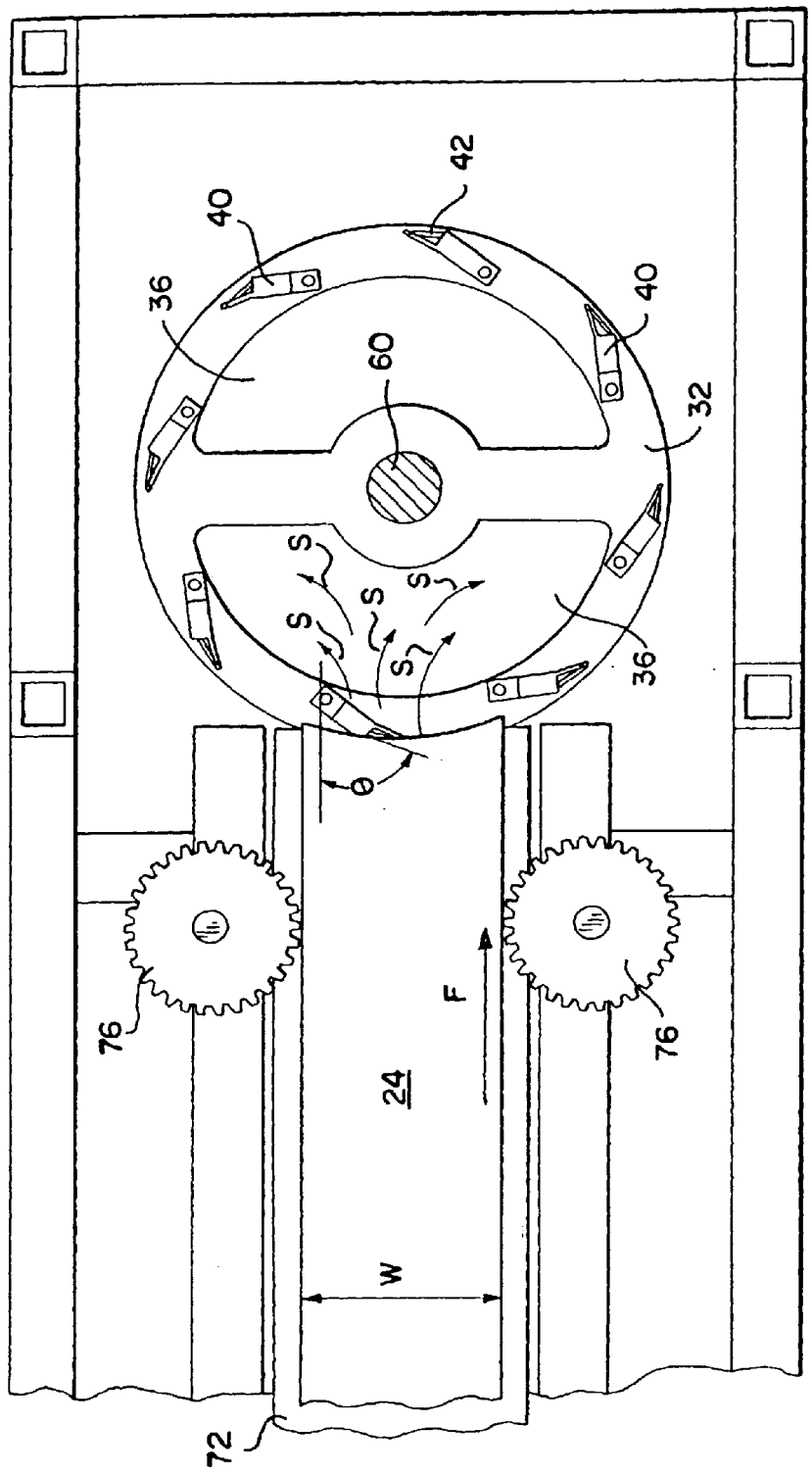
FIG. 5 illustrates a partial cross-sectional top view of the apparatus shown in FIG. 4, according to one preferred embodiment.
Figure 6:
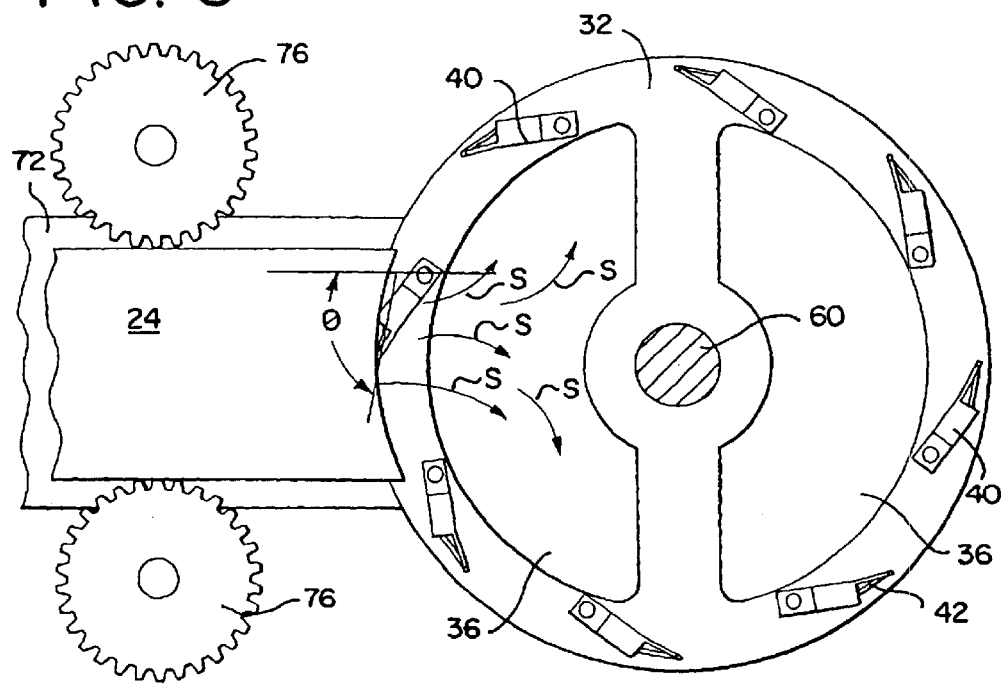
FIG. 6 illustrates an enlarged partial cross-sectional top view of the apparatus shown in FIG. 5, according to one preferred embodiment.

Referring now to FIGS. 5 and 6, a more detailed illustration of a preferred embodiment of the shredding unit 30 is provided. As shown in the preferred embodiment of FIGS. 5 and 6, the shredding unit comprises a plurality of cutting edges 42 which are rotatably driven about a shaft 60. Preferably, each cuffing edge 42 is spaced at a distance that is generally equidistant from each adjacent cutting edge 42. The axis of shaft 60 is generally or substantially perpendicular to the feed direction F.

As illustrated in FIGS. 3–6, a longitudinal blade (described in more detail below) defines each of the cutting edges 42. Each cutting edge or blade 42 is mounted to a blade holding plate 40. The cutting edges or blades 42 may be mounted to a respective blade holding plate 40 by any suitable means, such as screws. The blade holding plates 40 may be made of any suitable material, such as stainless steel. In the exemplary embodiment shown, the blade holding plates 40 are defined by a rectangular plate having a length of about 5 inches, a width of about 1 inch and a thickness of about 0.25 inch. Each of the blade holding plates 40 is mounted to a pair of circular plates or discs 32 and 34. In the exemplary embodiment shown, the distance between the disc 32 and the disc 34 is about 6 inches.

Referring to FIGS. 11–12, as illustrated, the block of cheese 24 is driven in the feed direction F by the conveying belt 72. The cutting edge 42 is rotatably driven around a circumference 80 such that the longitudinal edge of the shredding edge or blade 42 engages the front face 25 of the block of cheese 24. The axis 60 about which the shredding edge 42 rotates is perpendicular to the feed direction F.

Preferably, the circular plates 32 and 34 are constructed of a rigid material such as aluminum, steel, stainless steel or brass. In the exemplary embodiment shown, the diameter of each plate 32 and 34 is approximately 12 inches. In the exemplary embodiment illustrated, eight cutting edges 42 are mounted between the circular plates 32 and 34. As illustrated, the circular plates 32 and 34 are rotatably driven by shaft 60 about an axis that is substantially perpendicular to the feed direction F.

As best illustrated in FIGS. 5 and 6, preferably the bottom circular plate 32 has substantially crescent shape openings 36. As the cheese material is formed into shreds it is dispersed generally in the direction illustrated by the arrows S shown in FIGS. 5 and 6. As the shred of materials fall toward the ground due to the force of gravity, the shreds are able to exit the shredding units 30 through the present shape openings 36. It will, of course, be recognized that any suitable opening configuration may be used.

In the exemplary embodiment illustrated, the plates 32 and 34 are rotated by the shaft 60 at the rate of about 600 rpm. It will be recognized by those skilled in the art that the rate of rotation of the shaft 60 to rotate the shredding blades 42 will depend on the desired size of the shreds and the speed of the incoming block of cheese 24 in the F direction. In the illustrated embodiment, the angle θ of the blade 42 relative to the feed direction F is approximately 70° as the blade engages the front face of the block of cheese 24. The angle θ of the blade 42 may be varied to suit the particular thickness of the shred desired. For example, the angle θ may be from about 60° to about 90°.

Although in the illustrated embodiment the plurality of blades 42 are arranged in a substantially circular arrangement, it will be recognized by those skilled in the art that other suitable arrangements may be used. For example, the blades may be attached on a chain or belt which is rotatably driven about rollers 164 and 166, as illustrated in FIG. 13. The rollers 164 and 166 are driven by shafts 160 and 162, respectively. Attached to the conveying belt 132 is a plurality of blades 142 (only four illustrated) which engage the front face of the block of cheese 24 as it is driven in the direction F.

In the embodiment illustrated, the stack of ribbons 26 is arranged such that each ribbon 26 lies in a plane parallel to the feed plane 82, as illustrated in FIG. 11 (i.e., the plane of the feed belt 72). Alternatively, the stack may be arranged such that each ribbon 26 is aligned in a direction perpendicular to the feed plane 82. In the embodiment where the ribbons 26 lie in a plane parallel to the feed plane, the blade 42 follows the plane of the ribbons 26 as it moves across the front face 25 of the block 24. Thus, the shreds are formed such that the length of the shreds is parallel to the feed plane.

In the embodiment, when the ribbons are aligned perpendicular to the feed plane, the blade 42 follows a plane perpendicular to the plane of the ribbons 26 as it moves across the front face 25 of the block 24. Here the shreds are formed such that the length and width of the shreds lie in a plane perpendicular to the feed plane and the thickness of the shreds is defined in the feed direction.

In both of the embodiments described above, the thickness of the shreds is defined in the feed direction and the length and width of the shreds lie in a plane substantially perpendicular to the feed direction.

Figure 9:
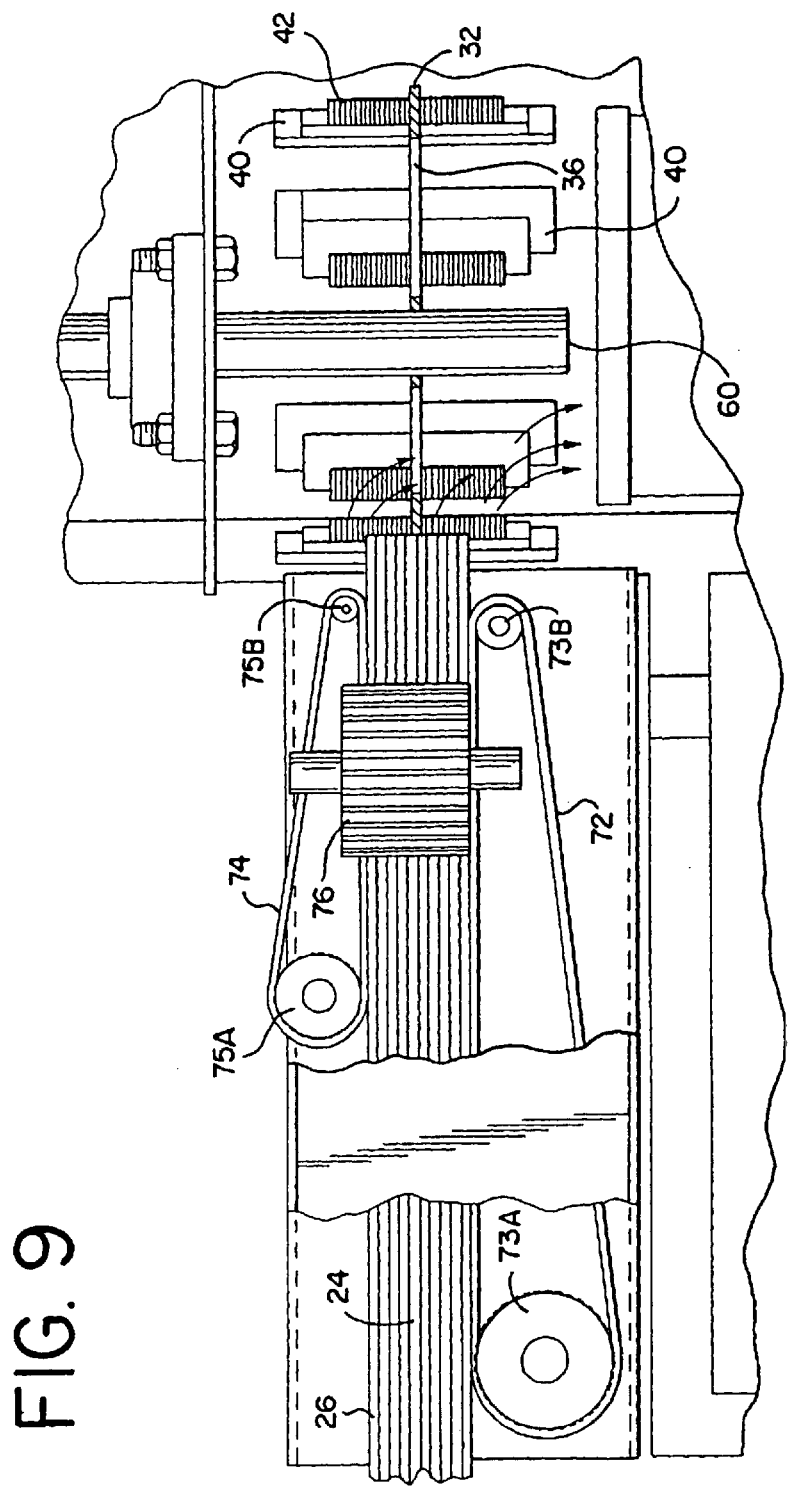
FIG. 9 illustrates an enlarged partial cross-sectional side view of an apparatus for cutting a block of material, according to one preferred embodiment.

Referring now to FIG. 9, another exemplary embodiment of the shredding unit 30 is illustrated. In this embodiment, each cutting edge 42 is mounted to a blade holding plate 40 as in the previous embodiments. In this embodiment, however, the blade holding plates 40 are attached to a single disk or circular plate 36. The plate 36 is arranged about the shaft 60 such that the plate 36 is substantially centered about the height H of the block of cheese 24.

Figure 10:
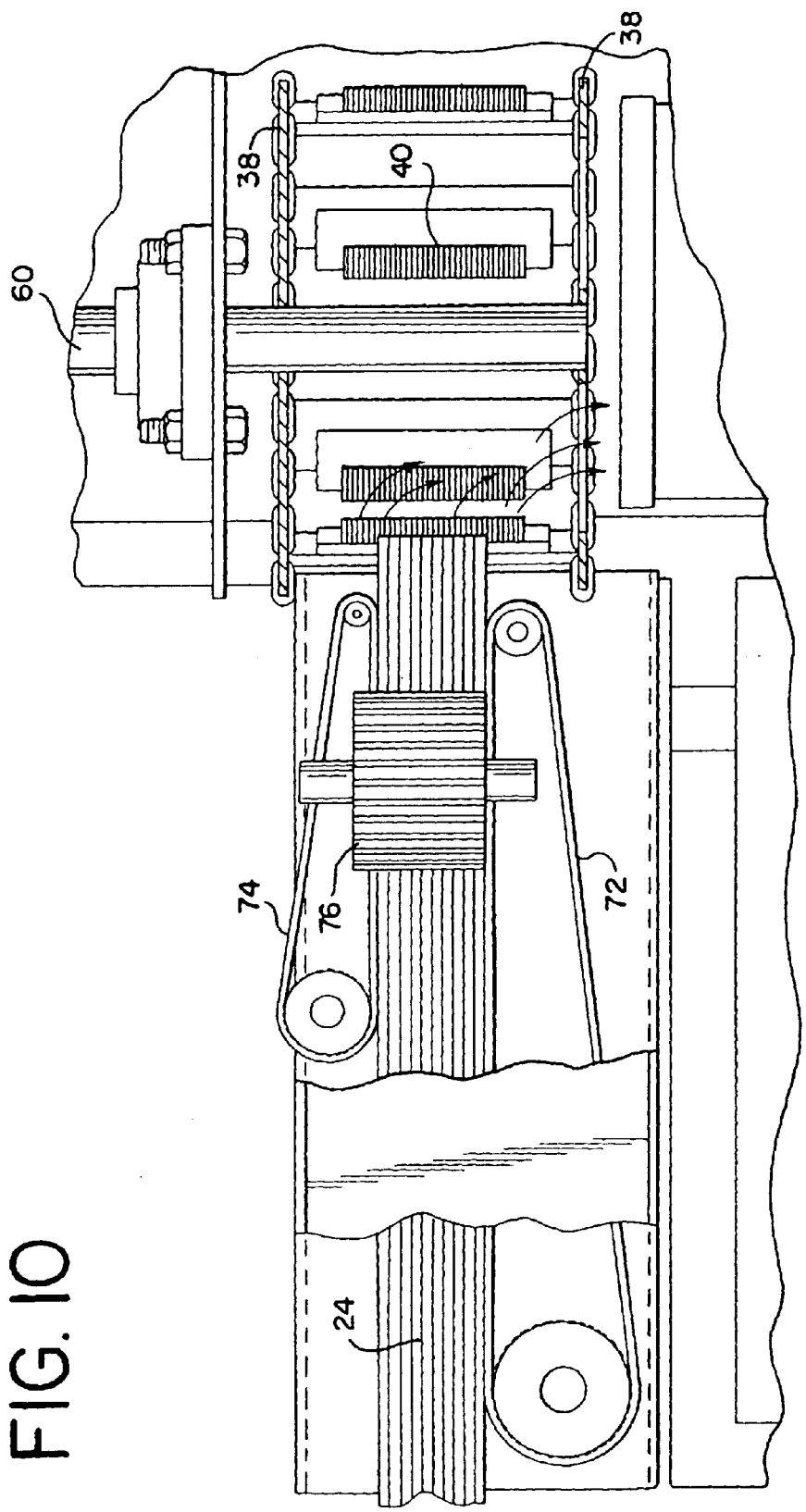
FIG. 10 illustrates an enlarged partial cross-sectional side view of an apparatus for cutting a block of material, according to one preferred embodiment.

FIG. 10 illustrates another preferred embodiment of the shredding unit 30. In the embodiment illustrated in FIG. 10, the cutting edges 42 are mounted to a series of chains 38 which are connected to a series of gears. The chains 38 and gears can be used to move the cutting edge 42 in any path desired. For example, the chains 38 can be arranged such that the path of the cutting edge forms a circle, an oval, a square or any other suitable regular or irregular shape.

A drive unit rotates the shaft 60 such that the blades 42 are moved across the front face of the block of cheese 24 to form the shreds. In the illustrated embodiment of FIG. 1, the drive unit 50 comprises a motor 58 connected to the shaft 60. The motor 58 may be any conventional motor such as an electric motor. In an exemplary embodiment, the motor 58 is an electric motor such as a 5 horsepower electric motor manufactured by Baldor. The shaft 61 of the motor 50 is connected to a pulley 54. A pulley 56 is connected to the shaft 60 which drives the shredding unit 30. The pulley 54 and pulley 60 are connected by any suitable means, such as the belt 52. When the electric motor 58 is activated it causes the motor shaft 61 to rotate which in turn causes the shaft 60 to rotate. As the shaft 60 rotates, the cutting unit rotates the blades 42 about the shaft 60 in a circular paths 80, as described above.

It will be recognized by those skilled in the art that the drive unit 50 may comprise other suitable drive mechanisms to rotate the shaft 60. For example, the drive unit 50 may be a gas engine, a series of electromagnets, a hydraulic pump or any other suitable mechanism known to those skilled in the art.

Figure 7:
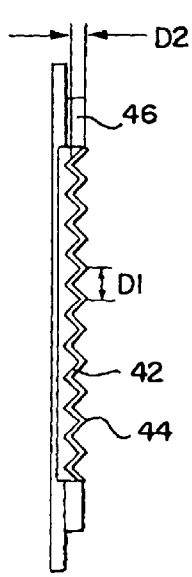
FIG. 7 illustrates a side view of a v-cut blade used in an apparatus for cutting a block of material, according to one preferred embodiment.
Figure 8:
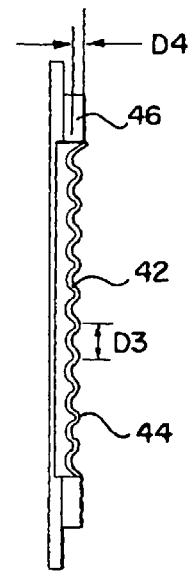
FIG. 8 illustrates a side view of a feather blade used in an apparatus for cutting a block of material, according to one preferred embodiment.

FIGS. 7 and 8 show preferred embodiments of the shape of the shredding or cutting blade 42. As illustrated in FIG. 7, preferably the cutting blade or edge 42 is a serrated blade having a v-cut cross-section, forming a plurality of peaks and valleys. Alternatively, as illustrated in FIG. 8, the cutting edge 42 is a blade having a feather-cut or repeated small u-shaped cross-section. In both of the embodiments shown in FIG. 7 and FIG. 8, the cutting edge 42 has teeth or folds 44 that are essentially grooves or ridges formed in the cutting edge. The teeth allow the cutting edge 42 to shred the block of cheese 24. In one embodiment for a v-shaped blade as shown in FIG. 7, the distance (D) between the teeth or folds 44 is less than the thickness (T) of each ribbon 26 which defines the block of cheese 24. In an exemplary embodiment, the blade 42 is about 6 inches long, the teeth are separated by a distance D1 of about 0.21 inches and a depth D2 of about 0.08 inches. In an embodiment for a feather cut blade as shown in FIG. 8, the distance D3 between the teeth may be about 0.1875 inches and the depth D4 of the teeth may be about 0.7 inches. The blade 42 may be manufactured from any suitable material such as hardened steel, stainless steel, aluminum or brass.

Preferably for the embodiment illustrated in the figures wherein a plurality of blades 42 are arranged on a rotating disk, every adjacent blade 42 has the teeth of the blades 42 offset by the distance D1 (for FIG. 7) or D4 (for FIG. 5). That is, the peak of one blade will coincide with the valley of an adjacent blade.

In the embodiment where the ribbons are stacked perpendicular to the belt 24, the block 24 is cut into small cubes of cheese, for example, cubes or chunk of ¼ inch×⅛ inch.

With the arrangement of the shredding unit 30, the shape of the shred can be determined by the shape or geometry of the particular blade used. Feathered shreds can be formed, for example, by using a blade as shown in FIG. 8. Thus, more traditionally shaped shreds can be formed from cheese fed from a continuous casting line.

Alternatively, the cutting edge 42 may have a flat or straight cross-section which can be used to cut the block of cheese 24 into slices instead of shreds. It will be recognized by those skilled in the art that the cutting blade 42 may comprise any other suitable cutting edges, for example, the cutting blade 42 may comprise a knife, a blade, a laser, a stream of pressurized water or other liquid, a wire, or a saw. Further, the shredding unit can comprise a rotatably driven drum and a plurality of cutting blades on the drum rotating about an axis. The cutting blades can be arranged substantially equally spaced apart on the drum.

As discussed above, the shredding devices and methods disclosed herein may be used to shred a block of cheese comprised of a plurality of ribbons or layers 26 of cheese stacked atop each other (as illustrated in FIGS. 3–5). Such ribbons 26 of cheese may be formed or manufactured by techniques known in the art. For example, a process and an apparatus for manufacturing a continuous sheet of cheese is described in U.S. Pat. Nos. 5,527,551 and 5,573,805, which are incorporated herein in their entirety by reference. These patents disclose a process wherein molten cheese is fed into a manifold, which in turn distributes a layer of the molten cheese onto a continuously moving endless belt, commonly called a casting belt. The casting belt may be manufactured from any suitable material, such as stainless steel.

The molten cheese is then cooled down on the casting belt to a temperature of about 40° F. to about 50° F., for about 1 minute to about 2 minutes, and more preferably at a temperature of about 45° F. for about 1 minute.

Figure 14:
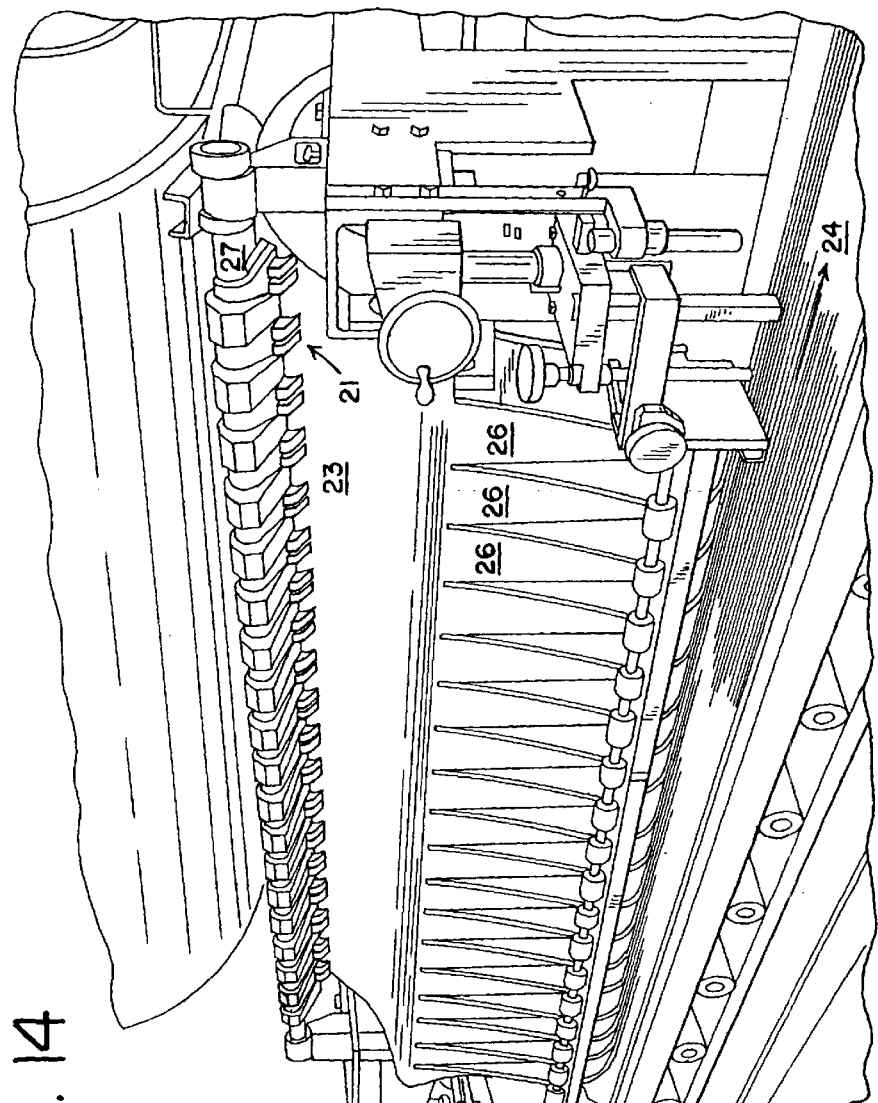
FIG. 14 illustrates a preferred embodiment of an arrangement for forming blocks of a material from a stack of ribbons of the material.

As illustrated in FIG. 14, the thin sheet of cheese 23 from the casting belt may then be sliced up along its width into a plurality of thin ribbons 26 by using cutters, such as a plurality of thin stainless steel slitter wheels 21. The ribbons may also be scored (partially cut through the thickness of the sheet) by using scoring wheels. As illustrated, a series of rollers are used to turn the ribbons 26 90° and then layer or stack the ribbons 26 on top of each other to form a block 24. The stacked ribbons of cheese are conveyed away by a belt in the direction shown by the arrow. In an exemplary embodiment, the total width of the sheet of cheese on the casting belt is about 36 inches.

As illustrated in FIG. 4 and FIG. 14, preferably, the ribbons 26 are generally sheets of material having a thickness (T) much less then their length (L). For example, in one preferred embodiment, ribbons 26 are formed from the sheet on the casting belt and have a thickness (T) of about 1/16 inch to about 1/4 inch, a width of about 2.0 inches to about 3.5 inches, and a length (L) of about 6.0 inches to about 3.0 feet. In an exemplary embodiment, block of cheese 24 is formed by stacking 10–12 ribbons of cheese to form a block having a height (H) of about 1 inch to about 3 inches, and a width (W) of about 2 inches to about 3 inches. The block comprised of the layered ribbons 26 is shred to form shreds of cheese having much smaller dimensions than the block of cheese 24. For example, for sheets or ribbons having a thickness of 1/4 inch, shreds are formed having dimensions of 1/8×1/8×1.5 inches. It will be recognized that the size of the shreds will have slight variations from shred to shred because of the physical characteristics of the cheese being shred. Also, the average shred size can be adjusted to any desired dimension depending on the particular blade 42 used, the thickness of the layers or ribbons 26, the speed of rotation of the shaft 60, the linear speed of the conveying unit in the feed direction F, and the overall size of the block of cheese 24.

Since the ribbons are formed from the continuous sheet of cheese formed on the casing line, the ribbons 26 also have a continuous length. The ribbons from a casting belt have a length that is truly continuous as long as the casting belt continues to run.

Forming a block of cheese 24 from a plurality of ribbons 26 provides some significant advantages over forming a block of cheese by conventional methods. For example, it has been found that for some types of cheese the flavor characteristics change depending on the cooling rate of the cheese. It has been found that the flavor characteristics of some types of cheeses degrade when these cheeses are formed by molding the cheese into a solid block from a hot melted cheese. It is believed that the cooling time required to cool the block of cheese affects the flavor. On the other hand, it has been found that when these cheeses are cooled relatively quick, such as by the casting line method described above, the flavor of the final product improves significantly. Therefore, it is desirable to form a block of cheese from a plurality of ribbons from a casting line. The block may then be fed to the shredding unit 30 described above so that shreds can be formed by cutting across the front face of the block of stacked ribbons. Although it has been known to produce a block of cheese from a plurality of ribbons and to then cut the block of plurality of ribbons into slices by cutting the block along its length, it is novel to form shreds of cheese from such a block by forming the shreds from the front face. Forming shreds from a casting line provides significant economical advantages. The casting line is a truly continuous method of forming a sheet of cheese. With the present invention, the continuous sheet of cheese is formed into a continuous block of cheese. The continuous block of cheese is then continuously shred as described above. Unlike the prior method of forming shreds from a casting line, however, the arrangement of the present invention may be used to form shreds having a traditional feathered shape.

It will be recognized by those skilled in the art that other suitable methods for forming a continuous block of cheese or other material may be used. For example, the block of cheese (or other material) may be formed by extruding the material into a solid block.

Thus, there has been disclosed in accordance with the invention, a method and apparatus for cutting a block of material that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

It is therefore intended that the foregoing detailed description be regarded as illustrative rather than limiting, and that it be understood that it is the following claims, including all equivalents, that are intended to define the spirit and scope of this invention.

What is claimed is:

1. An apparatus for shredding a block of material, the apparatus comprising:
    a shredding unit having a plurality of blades on a rotatably driven drum, the drum rotating about a substantially vertical axis;
    a drive unit that rotates the drum about the substantially vertical axis; and
    a feed unit that moves the block of material on a feed plane toward the shredding unit in a feeding direction, the feeding direction being substantially perpendicular to the substantially vertical axis about which the drum rotates,
    wherein the plurality of blades cut shreds of material from a front face of the block.

2. The apparatus of claim 1, wherein the feed unit comprises a mechanical arm that forces the block of material in the feed direction.

3. The apparatus of claim 1, wherein the feed unit comprises a bottom belt to support the bottom surface of the block of material, the bottom belt conveying the block of material in the feed direction.

4. The apparatus of claim 1, wherein the plurality of blades are substantially equally spaced apart on said drum.

5. The apparatus of claim 1, wherein the shredding unit includes an opening therein to allow the shreds of the material to pass therethrough.

6. An apparatus for shredding a block of material, the apparatus comprising:
    a shredding unit having blades revolving about an axis;
    a drive unit that moves the blades about the axis, wherein the blades define a cutting perimeter; and
    a feed unit that moves the block of material toward the cutting perimeter on a feed plane and in a feeding direction, the feed unit disposed upstream of the shredding unit, the feeding direction being generally perpendicular to and rotated about 90° from the axis about which the blades move.

7. The apparatus of claim 6, wherein the blades cut shreds of material from a front face of the block, and wherein the shredding unit includes an opening therein to allow shreds of the material to pass therethrough.

8. The apparatus of claim 6, wherein the blades comprises a serrated edge having a plurality of teeth.

9. The apparatus of claim 6, wherein the shredding unit comprises a rotatably driven drum, and wherein the blades are substantially equally spaced apart on said rotatably driven drum.

10. An apparatus for shredding a block of material, the apparatus comprising:

a shredding unit having a plurality of blades revolving about an axis;

a drive unit that rotates the plurality of blades about the axis; and a feed unit that moves the block of material toward the shredding unit on a feed plane and in a feeding direction, the feeding direction being generally perpendicular to and rotated about 90° from the axis about which the plurality of blades rotate, wherein the plurality of blades cut shreds of material from the front face of the block.

11. The apparatus of claim 10, wherein said shredding unit comprises a rotatably driven drum, and wherein the plurality of blades are arranged on the rotatably driven drum.

12. The apparatus of claim 11, wherein the shredding unit includes an opening therein for allowing shredded material to pass therethrough.

13. The apparatus of claim 10, wherein the feed unit further comprises an arm.

14. The apparatus of claim 13, wherein the arm comprises a mechanical arm.

15. The apparatus of claim 13, wherein the arm comprises a hydraulic arm.

16. An apparatus for shredding a material, the apparatus comprising:

a cutting unit, wherein the cutting unit slices the material into ribbons;

a shredding unit having a plurality of blades on a rotatably driven drum, the drum rotating about a substantially vertical axis;

a drive unit that rotates the drum about the substantially vertical axis; and a feed unit that moves the material toward the shredding unit on a feed plane and in a feeding direction, the feeding direction being generally perpendicular to the substantially vertical axis.

17. The apparatus of claim 16, wherein the feed unit comprises a mechanical device.

18. The apparatus of claim 17, wherein the shredding unit includes an opening therein for allowing shredded material to pass therethrough.

19. An apparatus for shredding a block of material, the apparatus comprising:

a shredding unit having a plurality of blades on a rotatably driven drum, the drum rotating about a substantially vertical axis;

a drive unit that rotates the drum about the substantially vertical axis; and a feed unit comprising a hydraulic mechanism that moves the block of material on a feed plane toward the shredding unit in a feeding direction, wherein the feeding direction is substantially perpendicular to the substantially vertical axis about which the drum rotates, and wherein the blades cut shreds of material from a front face of the block.

20. The apparatus of claim 19, wherein the shredding unit includes an opening therein for allowing shredded material to pass therethrough.

21. The apparatus of claim 19, wherein the plurality of blades are substantially equally spaced apart on said drum.

22. The apparatus of claim 19, wherein the plurality of blades are configured to cut cheese, and wherein the block of material comprises a solid block of cheese.

23. An apparatus for shredding a material comprising:

a shredding unit having a plurality of blades on a rotatably driven drum, the drum rotating about a substantially vertical axis;

a drive unit that rotates the drum about the substantially vertical axis; and a feed unit comprising a mechanical device that moves the material on a feed plane toward the shredding unit in a feeding direction, the feeding direction being generally perpendicular to and rotated about 90° from the substantially vertical axis.

24. The apparatus of claim 23, wherein the mechanical device comprises a mechanical arm.

25. The apparatus of claim 23, wherein the mechanical device comprises a hydraulic arm.

26. The apparatus of claim 23, wherein the mechanical device comprises a conveyor belt.

27. The apparatus of claim 23, wherein the mechanical device comprises a series of rollers.

28. The apparatus of claim 23, wherein the plurality of blades are configured to cut cheese, and wherein the material comprises a solid block of cheese.

* * * * *

EX PARTE REEXAMINATION CERTIFICATE (6778th)

United States Patent
Owens

(10) Number: US 6,722,597 C1
(45) Certificate Issued: Apr. 21, 2009

(54) APPARATUS AND METHOD FOR SHREDDING BLOCKS OF MATERIAL

(75) Inventor: Shawn Owens, Joplin, MO (US)

(73) Assignee: Schreiber Foods, Inc., Green Bay, WI (US)

Reexamination Request:
No. 90/008,331, Dec. 29, 2006

Reexamination Certificate for:
Patent No.: 6,722,597
Issued: Apr. 20, 2004
Appl. No.: 10/372,625
Filed: Feb. 21, 2003

Related U.S. Application Data

(63) Continuation of application No. 10/022,630, filed on Dec. 17, 2001, now Pat. No. 6,536,692, which is a continuation of application No. 09/492,102, filed on Feb. 14, 2000, now Pat. No. 6,340,490.

(51) Int. Cl.
*B02C 13/00* (2006.01)
*B02C 18/00* (2006.01)

(52) U.S. Cl. ............................ 241/92; 241/93; 241/282

(58) Field of Classification Search .................... 241/92, 241/93, 282
See application file for complete search history.

(56) References Cited

U.S. PATENT DOCUMENTS

| | | |
|---|---|---|
| 4,111,087 A | 9/1978 | Pankratz et al. |
| 4,600,159 A | 7/1986 | Akesson |
| 4,735,817 A | 4/1988 | Smith |
| 5,660,341 A | 8/1997 | Perkins et al. |
| 5,673,539 A | 10/1997 | Jonovic et al. |
| 6,722,597 B2 | 4/2004 | Owens |

*Primary Examiner*—Jimmy G Foster

(57) ABSTRACT

An apparatus and method for shredding a block of material, the apparatus includes at least one cutting blade. A drive unit rotates the cutting blade about an axis, and a feed unit moves the block of material toward the cutting blade. The axis about which the cutting blade is rotated is generally perpendicular to the direction in which the block of material is being fed. In one embodiment, the block of material comprises a plurality of ribbons, the ribbons being stacked atop each other. In one preferred embodiment, the cutting blade comprises a serrated edge, and the distance between the teeth in the serrated edge is less than the thickness of each ribbon. In another embodiment, the shredding unit includes a plurality of blades on a rotatably driven drum.

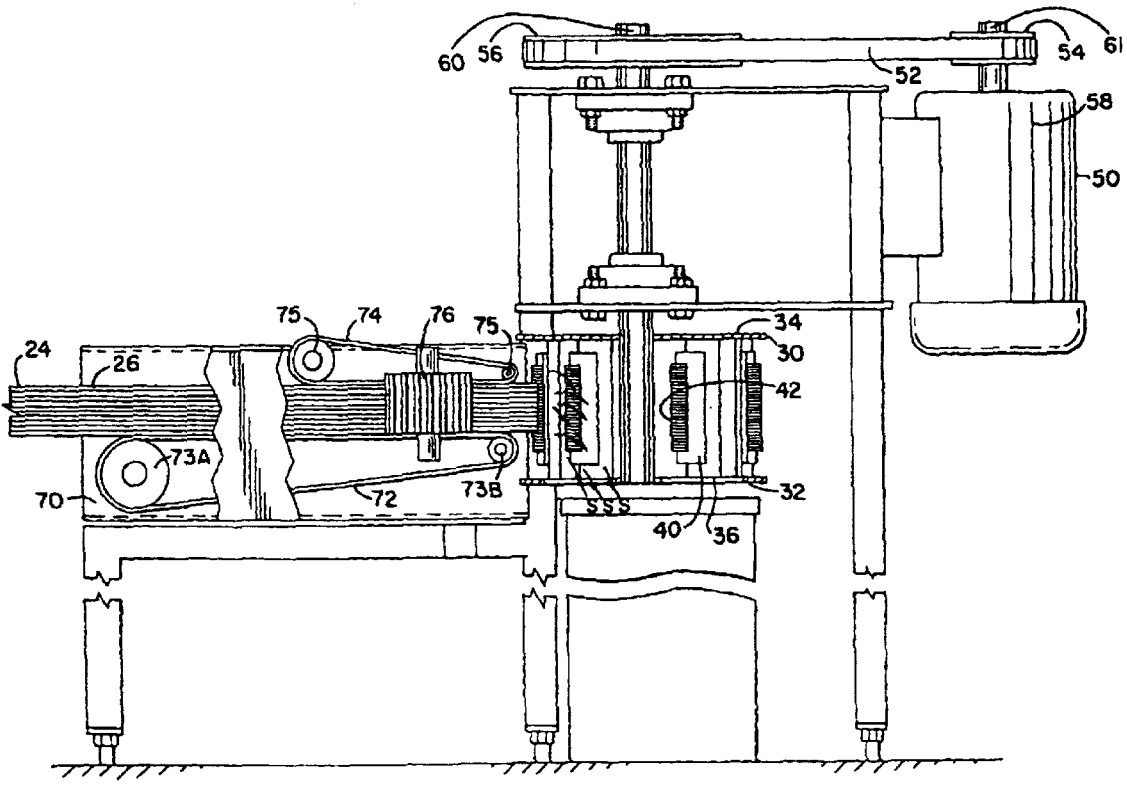

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6, 7, 9–15 and 19–28 are cancelled.

Claim 1 is determined to be patentable as amended.

Claims 2–5, dependent on an amended claim, are determined to be patentable.

Claims 8 and 16–18 were not reexamined.

1. An apparatus for shredding a block of material, the apparatus comprising:
   a shredding unit having a plurality of blades on a rotatably driven drum, the drum rotating about a substantially vertical axis;
   a drive unit that rotates the drum about the substantially vertical axis; and
   a feed unit that moves the block of material on a feed plane toward the shredding unit in a feeding direction, the feeding direction being substantially perpendicular to the substantially vertical axis about which the drum rotates, wherein the plurality of blades cut shreds of material from a front face of the block, *and*
   *wherein the plurality of blades each have teeth that are offset with respect to adjacent blades.*

\* \* \* \* \*